(12) United States Patent
Herb

(10) Patent No.: US 10,855,088 B2
(45) Date of Patent: Dec. 1, 2020

(54) SELF-HEALING CHARGING DEVICE

(71) Applicant: T-Mobile USA, Inc., Bellevue, WA (US)

(72) Inventor: Daniel E. Herb, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 180 days.

(21) Appl. No.: 16/017,948

(22) Filed: Jun. 25, 2018

(65) Prior Publication Data
US 2018/0300216 A1 Oct. 18, 2018

Related U.S. Application Data

(62) Division of application No. 14/542,330, filed on Nov. 14, 2014, now Pat. No. 10,031,826.

(51) Int. Cl.
*H02J 7/00* (2006.01)
*G06F 11/34* (2006.01)
(Continued)

(52) U.S. Cl.
CPC ........ *H02J 7/00032* (2020.01); *G06F 11/008* (2013.01); *G06F 11/0742* (2013.01);
(Continued)

(58) Field of Classification Search
CPC . H02J 7/0052; H02J 7/00032; G06F 11/0742; G06F 11/3065; G06F 11/3466
(Continued)

(56) References Cited

U.S. PATENT DOCUMENTS

| 6,792,393 | B1 | 9/2004 | Farel et al. |
| 8,560,865 | B2 | 10/2013 | Goel |

(Continued)

FOREIGN PATENT DOCUMENTS

| CN | 203827000 U | 9/2014 |
| CN | 203850892 U | 9/2014 |

(Continued)

OTHER PUBLICATIONS

The Extended European Search Report dated May 15, 2018, for European Application No. 15859665.0, 8 pages.
Office Action for U.S. Appl. No. 14/976,068, dated Feb. 14, 2018, Herb, "Self-Healing Charging Device", 17 pages.
Office action for U.S. Appl. No. 14/542,330, dated Apr. 11, 2017, Herb, "Self-Healing Charging Device", 9 pages.
(Continued)

*Primary Examiner* — Edward Tso
*Assistant Examiner* — Aaron Piggush
(74) *Attorney, Agent, or Firm* — Lee & Hayes, P.C.

(57) ABSTRACT

Self-healing charging devices and techniques for identifying and/or troubleshooting causes of performance degradation in user devices are described. The self-healing charging devices described herein can leverage performance logs associated with user devices to identify problems on the user devices while the user devices are charging. Additionally or alternatively, the self-healing charging devices can leverage predictive models learned from a collection of data derived from a plurality of users associated with a network to identify usage and/or performance patterns for predicting issues that can arise based on usage patterns of the user of the user device. In some examples, the self-healing charging devices can be communicatively coupled to at least one network for offloading some of the processing. The self-healing charging devices can enable users to easily identify issues causing and/or leading to performance degradation on their user devices and remedy and/or prevent problems that cause the performance degradation.

20 Claims, 7 Drawing Sheets

(51) Int. Cl.
*G06F 11/00* (2006.01)
*G06F 11/07* (2006.01)
*G06F 11/30* (2006.01)
*H01M 10/42* (2006.01)

(52) U.S. Cl.
CPC ...... *G06F 11/0793* (2013.01); *G06F 11/3065* (2013.01); *G06F 11/3409* (2013.01); *G06F 11/3466* (2013.01); *H02J 7/00* (2013.01); *H02J 7/007* (2013.01); *G06F 11/3447* (2013.01); *G06F 11/3476* (2013.01); *H01M 10/4257* (2013.01)

(58) Field of Classification Search
USPC ............... 320/107, 114, 134; 702/185, 186; 607/60; 340/12.37; 700/83; 714/48
See application file for complete search history.

(56) References Cited

U.S. PATENT DOCUMENTS

| | | |
|---|---|---|
| 9,048,570 B2 | 6/2015 | Goel |
| 9,646,480 B2 | 5/2017 | Fadell et al. |
| 9,685,052 B2 | 6/2017 | Kashar |
| 2002/0094849 A1 | 7/2002 | Cannon et al. |
| 2002/0198627 A1 | 12/2002 | Nasman et al. |
| 2003/0197512 A1 | 10/2003 | Miller et al. |
| 2006/0089733 A1 | 4/2006 | Dickinson et al. |
| 2007/0255460 A1 | 11/2007 | Lopata |
| 2009/0040029 A1* | 2/2009 | Bridges ............ G06Q 50/06 340/12.37 |
| 2010/0222847 A1* | 9/2010 | Goetz ............ A61M 5/14276 607/60 |
| 2013/0069598 A1 | 3/2013 | Tanaka et al. |
| 2014/0327393 A1 | 11/2014 | Lee et al. |
| 2016/0139974 A1 | 5/2016 | Herb et al. |

FOREIGN PATENT DOCUMENTS

| | | |
|---|---|---|
| JP | 2010081683 | 4/2010 |
| WO | WO2010128389 A1 | 11/2010 |
| WO | WO2012098554 | 7/2012 |
| WO | WO2013152190 | 10/2013 |

OTHER PUBLICATIONS

Office Action for U.S. Appl. No. 14/542,330, dated Aug. 22, 2017, Herb, "Self-Healing Charging Device", 10 pages.

The PCT Seach Report and Written Opinion dated Mar. 8, 2016 for PCT application No. PCT/US2015/058561, 9 pages.

Sumner, Kelly, "MEEM—World's First Charger Cable with Automatice Back Up" Available as early Feb. 16, 2016 at <https://www.kickstarter.com/projects/868671768/meem-memory-cable> Kickstarter, 22 pages.

The Chinese Office Action dated Jan. 6, 2020, for Chinese Patent Application No. 201580061251.3, a counterpart foreign application of the U.S. Pat. No. 10,031,826, 10 pages.

The Extended European Search Report dated Dec. 16, 2019, for European Patent Application No. 19184270.7, 9 pages.

* cited by examiner

SELF-HEALING CHARGING DEVICE

CROSS-REFERENCE TO RELATED APPLICATION

This application is a divisional of and claims priority to U.S. patent application Ser. No. 14/542,330, entitled "Self-Healing Charging Device," filed on Nov. 14, 2014, and is incorporated herein by reference.

BACKGROUND

Performance of user devices such as smartphones or tablets can degrade with usage over time. Poor and/or inefficient performance can result in reduced battery life, application failures, dropped calls, user interface glitches, etc. Users rarely can identify what is causing the performance of a user device to degrade over time without inconvenience. Current techniques for identifying what is causing the performance of a user device to degrade overtime are intrusive in addition to being inconvenient. Generally, users are required to forgo access to their user devices and/or are generally required to travel to specific destination(s) (e.g., retail stores, etc.) in order to identify causes of the performance degradation.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, techniques for diagnosing and remedying problems on user devices via self-healing charging devices. Performance of user devices such as smartphones, tablets, etc., can degrade with usage over time. Poor and/or inefficient performance can result in reduced battery life, application failures, dropped calls, user interface glitches, etc. Poor and/or inefficient performance can result from various causes. In some examples, users neglect to update the operating system and/or software associated with applications running on user devices causing the user devices to operate less efficiently. In additional or alternative examples, usage patterns can affect the speed and/or efficiency of user devices. For instance, a user can operate his or her device with numerous applications running in the background. The numerous applications can consume resources causing a corresponding user device to operate less efficiently. In other instances, a user can write numerous files to a filing system associated with a user device causing the user device to operate less efficiently.

A user rarely can identify what is causing the performance of a user device to degrade over time without inconvenience and/or intrusion. Current techniques for identifying and/or predicting causes of performance degradation include performing a factory reset of a user device, installing and decoding bug logs, and/or using purpose-built diagnostic tools. For robust diagnostic and resolution, users typically are required to forgo access to their user devices during the performance(s) of a factory reset of user devices, installation and analysis of bug logs, and/or use of purpose-built diagnostic tools. Additionally, users are generally required to travel to specific destination(s) (e.g., retail stores, etc.) in order to identify causes of the performance degradation.

Self-healing charging devices and techniques for identifying and/or troubleshooting causes of performance degradation are described herein. The self-healing charging devices described herein can leverage performance logs associated with user devices to identify problems on the user devices while the user devices are charging. Additionally or alternatively, the self-healing charging devices can leverage a collection of data derived from a plurality of users and information sets associated with a network and consumer behavior to identify usage and/or performance patterns for predicting issues that can arise based on usage patterns of a particular user of a corresponding user device. The self-healing charging devices can enable users to easily identify issues causing and/or leading to performance degradation on user devices and to take action to remedy and/or prevent problems that cause the performance degradation.

Example Environments

Figure 1:
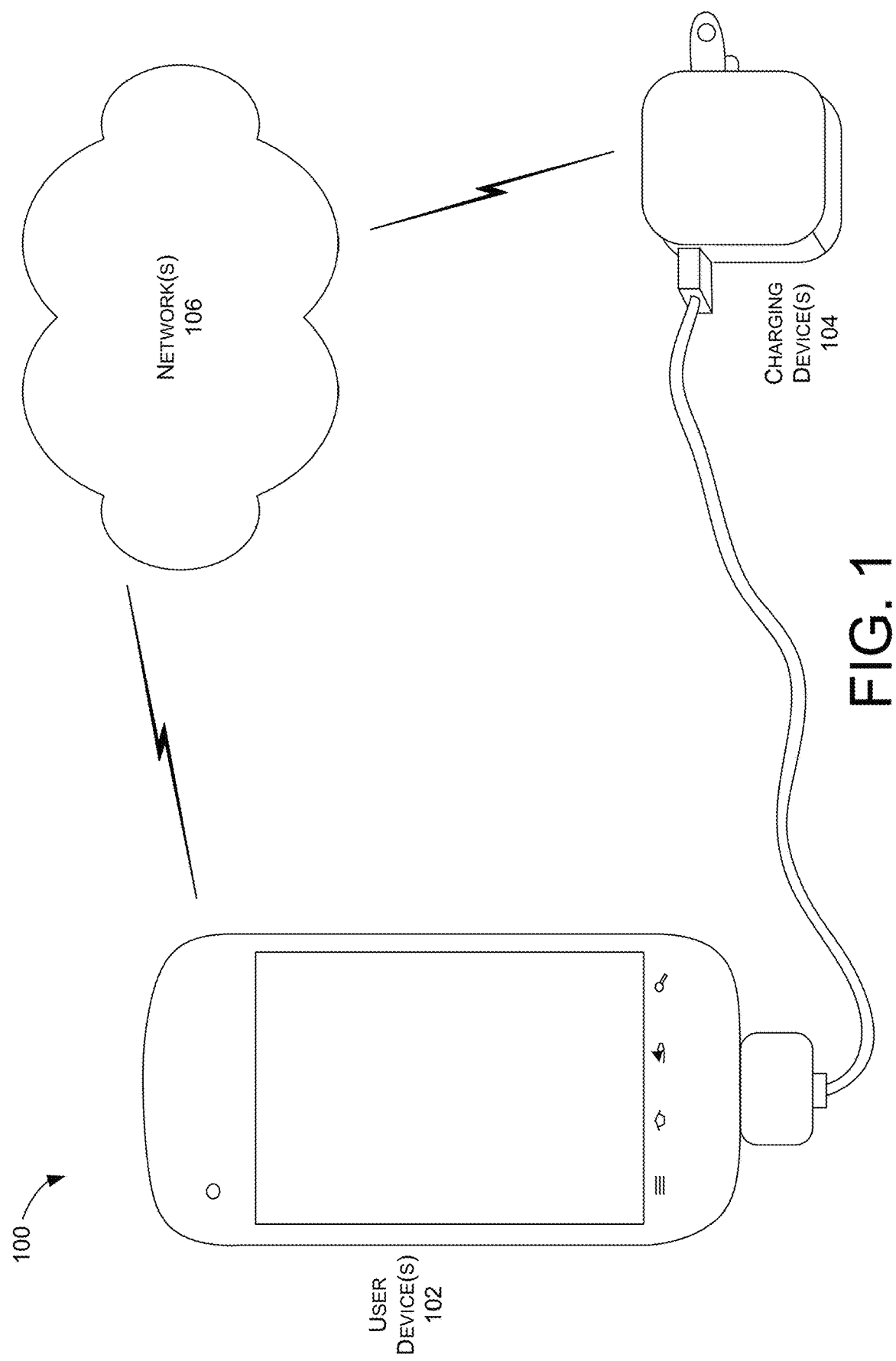
FIG. 1 is a schematic diagram illustrating an example environment for diagnosing and remedying problems on user devices via self-healing charging devices.

FIG. 1 is a schematic diagram illustrating an example environment 100 for diagnosing and remedying problems on user devices via self-healing charging devices. FIG. 1 includes user device(s) 102 that can be connected to charging device(s) 104. User device(s) 102 can represent a diverse variety of device types and are not limited to any particular type of user device. Examples of user device(s) 102 can include but are not limited to stationary computers, mobile computers, embedded computers, or combinations thereof. Example stationary computers can include desktop computers, work stations, personal computers, thin clients, terminals, game consoles, personal video recorders (PVRs), set-top boxes, or the like. Example mobile computers can include laptop computers, tablet computers, wearable computers, implanted computing devices, telecommunication devices, automotive computers, personal data assistants (PDAs), portable gaming devices, media players, cameras, or the like. Example embedded computers can include network enabled televisions, integrated components for inclusion in a computing device, appliances, microcontrollers, digital signal processors, or any other sort of processing device, or the like.

User device(s) 102 can communicatively couple to charging device(s) 104 via wired or wireless connections. Charging device(s) 104 can represent a diverse variety of device types and are not limited to any particular type of charging device. Examples of charging device(s) 104 can include but are not limited to wired charging devices, wireless charging devices, etc. Wired charging devices include standard outlet charging devices, USB charging devices, fuel-cell charging devices, kinetic-energy charging devices, etc. Wireless charging devices include wireless charging devices that use inductive coupling, conductive recharging mats, radio transmission, WiFi, etc.

The user device(s) 102 and/or the charging device(s) 104 can communicate with network(s) 106. In some examples, the network(s) 106 can be any type of network known in the art, such as the Internet. In other examples, the network(s) 106 may be, or may include, network(s) of telecommunication service provider(s). Moreover, the user device(s) 102 and/or the charging device(s) 104 can communicatively couple to the network(s) 106 in any manner, such as by a global or local wired or wireless connection (e.g., local area network (LAN), intranet, etc.).

The network(s) 106 can facilitate communication between the user device(s) 102 and the charging device(s) 104. The network(s) 106 can also provide updates to the charging device(s) 104 and/or important information to users of the user device(s) 102 and/or charging device(s) 104. For instance, the network(s) 106 can provide Operating System and/or software updates and fixes that may be provided by manufacturers of the user device(s) 102 and/or service providers. Additionally, the network(s) 106 can observe the performance of the charging device(s) 104 for learning about the performance of the charging device(s) 104 and making improvements over time. Moreover, the network(s) 106 can collect usage and/or performance data from a plurality of users associated with the network(s) 106 for gaining intelligence and generating predictive models for predicting possible issues based on usage and/or performance of the user device(s) 102.

The user device(s) 102, the charging device(s) 104, and the network(s) 106 can communicate such to diagnose and remedy problems on the user device(s) 102 while the charging device(s) 104 charge the user device(s) 102. The charging device(s) 104 can leverage performance logs, parameters, and/or data received from user device(s) 102 to identify problems on the user device(s) 102 while the user device(s) 102 are charging. Additionally or alternatively, the charging device(s) 104 can leverage a collection of data received from the network(s) 106 to identify and/or predict problems on the user device(s) 102 while the user device(s) 102 are charging. The collection of data can reflect behavior of a plurality of users associated with a plurality of user device(s) 102 that are communicatively coupled to the network(s) 106 and can be used to identify usage and/or performance patterns. The usage and/or performance patterns can be leveraged for predicting issues that can arise based on usage patterns of users of user device(s) 102. The charging device(s) 104 can enable users to easily identify issues that are causing or have the potential to cause performance degradation while the user device(s) 102 are charging and can enable the users to take action to remedy and/or prevent problems that cause the performance degradation.

Figure 2:
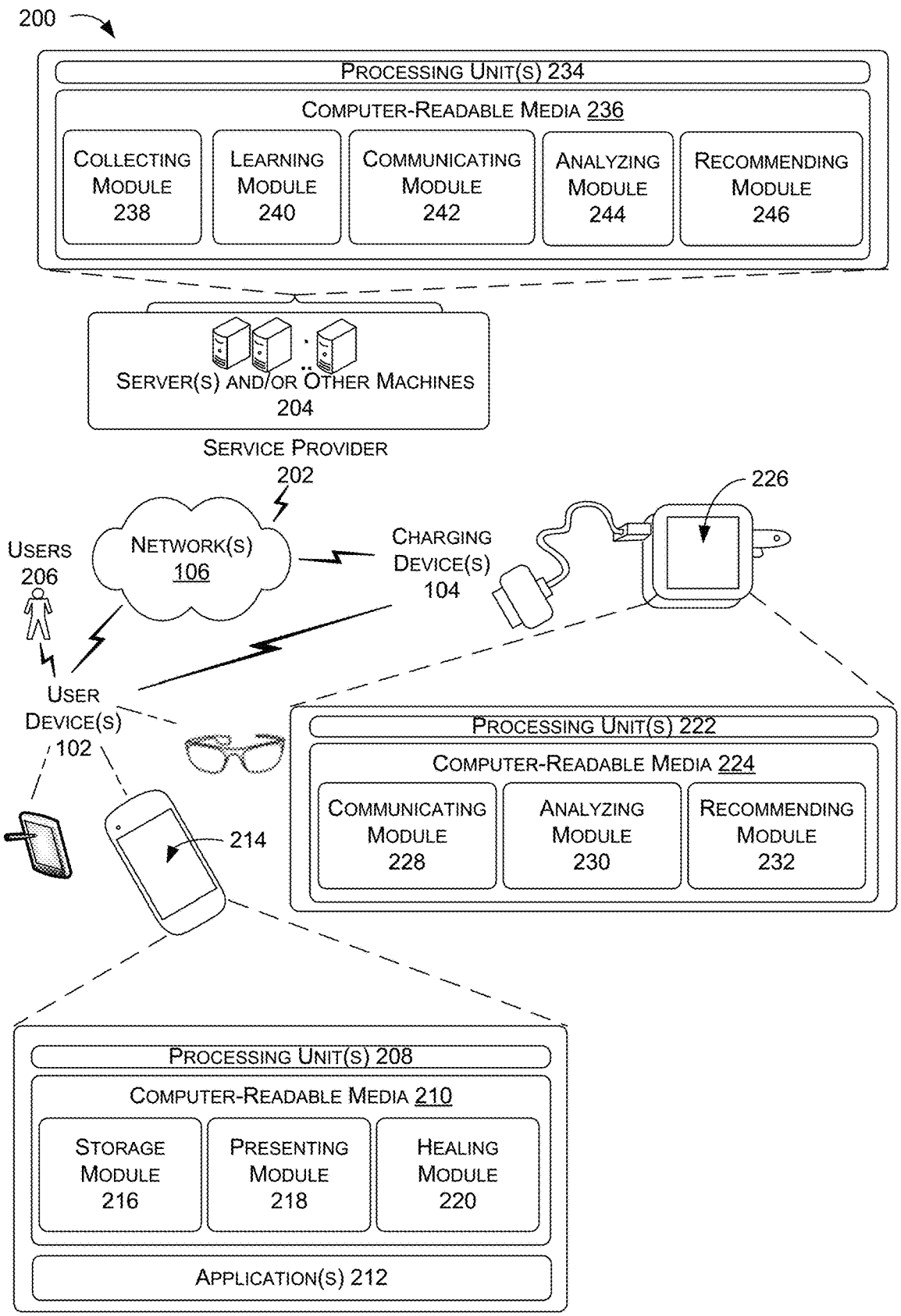
FIG. 2 is a schematic diagram illustrating an example environment for diagnosing and remedying problems on user devices via self-healing charging devices.

FIG. 2 is a schematic diagram illustrating an example environment 200 for diagnosing and remedying problems on user device(s) 102 via self-healing charging device(s) 104. The example environment 200 can include a service provider 202, network(s) 106, user device(s) 102, and charging device(s) 104. As shown, the service provider 202 can include one or more server(s) and/or other machines 204. In various webservice or cloud based embodiments, the service provider 202 can collect data from one or more users 206 associated with the user device(s) 102, analyze data associated with the user device(s) 102, and/or diagnose and remedy problems on the user device(s) 102 while the charging device(s) 104 are charging the user device(s) 102.

In some examples, the network(s) 106 can be any type of network known in the art, such as the Internet. In other examples, the network(s) 106 may be, or may include, network(s) of telecommunication service provider(s), as described above. The user device(s) 102 can communicatively couple to the network(s) 106 in any manner, such as by a global or local wired or wireless connection (e.g., local area network (LAN), intranet, etc.). The network(s) 106 can facilitate communication between the server(s) and/or other machines 204 and the user device(s) 102 associated with the users 206.

As described above, the network(s) 106 can provide updates to the charging device(s) 104 and/or important information to users 206 of the user device(s) 102 and/or charging device(s) 104. For instance, the network(s) 106 can provide Operating System and/or software updates and fixes that may be provided by manufacturers of the user device(s) 102 and/or service providers 202. Additionally, the network(s) 106 can observe the performance of the charging device(s) 104 for learning about the performance of the charging device(s) 104 and making improvements over time. Moreover, the network(s) 106 can collect usage and/or performance data from a plurality of users associated with the network(s) 106 for gaining intelligence and generating predictive models for predicting possible issues based on usage and/or performance of the user device(s) 102.

In some examples, the users 206 can operate corresponding user device(s) 102 to perform various functions associated with the user device(s) 102, which can include one or more processing unit(s) 208, computer-readable storage media 210, application(s) 212, and a display 214. Furthermore, the users 206 can utilize the user device(s) 102 to communicate with other users 206 via the network(s) 106.

User device(s) 102 can represent a diverse variety of device types and are not limited to any particular type of device, as described above. User device(s) 102 can include any type of computing device having one or more processing unit(s) 208 operably connected to computer-readable media 210 such as via a bus, which in some instances can include one or more of a system bus, a data bus, an address bus, a PCI bus, a Mini-PCI bus, and any variety of local, peripheral, and/or independent buses. Executable instructions stored on computer-readable media 210 can include, for example, a storage module 216, a presenting module 218, a healing module 220, and other modules, programs, or applications that are loadable and executable by processing units(s) 208.

The user device(s) 102 can include applications 212. Application(s) 212 are created by programmers to fulfill specific tasks on user device(s) 102. For example, application(s) 212 can provide utility, entertainment, and/or productivity functionalities to users 206 of user device(s) 102. In at least one example, application(s) 212 can query logs, parameters, and/or data to learn information about the user device(s) 102. In some examples, the application(s) 212 can query various components associated with the user device(s) 102 to retrieve parameters stored for each of the various components. For instance, the application(s) 212 can query a battery component of the user device(s) 102 to retrieve a parameter that communicates a level of the battery power. In other examples, the application(s) 212 can query the storage module 216 for logs representative of activities performed by the respective user device(s) 102, as described below.

The application(s) 212 can interact with the presenting module 218 to cause a prompt to be presented to a user 206 via a display 214 of a user device 102. The prompt can be based on a recommendation, as described below. The user 206 can interact with the prompt via the user device 102 to direct the healing module 220 to remedy any issues affecting performance identified by the charging device 104, as described below.

The storage module 216 can collect and store logs representative of activities of the user device(s) 102, data associated with the network(s) 106, and/or demographic data about users 206 of user device(s) 102. In some examples, the logs can include activity logs, debugging logs, etc. The activity logs can determine application(s) 212 that have been running on user device(s) 102, activities that users 206 take with respect to the application(s) 212, websites that the users 206 visit, words that the users 206 type, GPS locations that the users 206 visit, etc. Debugging logs can determine application(s) 212 that have been and/or are running on the user device(s) 102, activities that the users 206 take with respect to the application(s) 212, errors that have occurred while the application(s) 212 have been running, etc. The network data stored in the storage module 216 can include data representative of connections between the user device(s) 102 and the network(s) 106. The network data can provide information such as packet losses over time, connection interruptions, etc. The demographic data about the users 206 of the user device(s) 102 can include gender, age, occupation, residence, location of work, location of home, etc.

In some examples, the storage module 216 may request permission before collecting and/or storing the logs representative of activities of the user device(s) 102, data associated with the network(s) 106, and/or demographic data about users 206. For instance, the storage module 216 may request to access information that includes personally identifiable information (PII) that identifies or can be used to identify, contact, or locate a person to whom such information pertains. In such examples, users 206 may be provided with notice that the systems and methods herein are collecting PII. Additionally, prior to initiating PII data collection, users 206 may have an opportunity to opt-in or opt-out of the PII data collection. For example, a user 206 may opt-in to the PII data collection by taking affirmative action indicating that he or she consents to the PII data collection. Alternatively, a user 206 may be presented with an option to opt-out of the PII data collection. An opt-out option may require an affirmative action to opt-out of the PII data collection, and in the absence of affirmative user action to opt-out, PII data collection may be impliedly permitted.

The storage module 216 may also leverage various security mechanisms to encrypt or otherwise protect the logs representative of activities of the user device(s) 102, data associated with the network(s) 106, and/or demographic data. The user device(s) 102 can provide the logs, parameters, and/or data to the charging device(s) 104 and/or the network(s) 106 for analyzing and/or making recommendations for remedying and/or preventing performance degradation in the user device(s) 102.

The presenting module 218 can communicate with the application(s) 212 to cause recommendations to be presented to a user 206 for remedying and/or preventing performance degradation in the user device(s) 102, as described above. The presenting module 218 can cause a prompt to be presented to the user 106 via the display 214.

In some examples, the prompt can include a general screen that presents users 206 with one or more options for remedying and/or preventing performance degradation in the user device(s) 102. For instance, the prompt can provide the user 206 with an option to perform all actions to remedy and/or prevent performance degradation in the user device(s) 102, an option to deny all actions for remedying and/or preventing performance degradation in the user device(s) 102, or an option to view a specific screen. Additionally or alternatively, the prompt can provide the user 206 with an option to perform all actions recommended and to always perform all actions without future prompting, an option to deny all actions recommended and to always deny all actions without future prompting, or an option to always provide a specific screen. The specific screen can present users 206 with additional information for improving performance in his or her user device 102. For instance, the specific screen can comprise an itemized list of actions that a recommending module recommends be taken to remedy and/or prevent performance degradation in the user device(s) 102. The user 206 can selectively choose which actions to allow the healing module 220 to take and which actions to deny the healing module 220.

Based at least in part on the presenting module 218 causing the prompt to be presented to the user 206 via the application(s) 212, the healing module 220 can receive an indication of the user's 206 preference for remedying and/or preventing performance degradation in the user device(s) 102. Upon receiving an indication that the user 206 would like to take one or more actions recommended by a recommending module to remedy and/or prevent performance degradation of the user device(s) 102, the healing module 220 can effectuate the one or more actions. The indication from the user 206 can be in the form of user interaction with the display, such as selecting an option via a touch user interface, dictating an option via a spoken-language interface, etc. Based at least in part on receiving an indication from a user 206 to perform at least some of the actions recommended by a recommending module, the healing module 220 can effectuate those actions. For instance, the healing module 220 can partially restart the user device(s) 102, reset or recharge the battery, close down one or more application(s) 212 running in the background, delete inactive application(s) 212, etc.

In some examples, the users 206 can charge the user device(s) 102 via charging device(s) 104, which can include one or more processing unit(s) 222 and computer-readable storage media 224. In some examples, the charging device(s) 104 can include a display 226. The charging device(s) 104 can represent a diverse variety of device types and are not limited to any particular type of charging device, as described above. The charging device(s) 104 can include any type of charging device having one or more processing unit(s) 222 operably connected to computer-readable media 224 such as via a bus, which in some instances can include one or more of a system bus, a data bus, an address bus, a PCI bus, a Mini-PCI bus, and any variety of local, peripheral, and/or independent buses. Executable instructions stored on computer-readable media 222 can include, for example, a communicating module 228, an analyzing module 230, a recommending module 232, and other modules, programs, or applications that are loadable and executable by processing units(s) 220. For instance, in some examples, the executable instructions stored on computer-readable media 222 can include a presenting module (not shown) to perform functionality similar to the functionality performed by the presenting module 218 described above. That is, computer-readable media 222 can include a presenting module (not shown) for causing a prompt to be displayed on the display 226 of the charging device 104.

The communicating module 228 stored on the charging device(s) 104 can send and receive data from the user device(s) 102. For instance, the communicating module 228 can receive the logs, parameters, and/or data from the user device(s) 102. The data can include network data and/or user demographic data from the user device(s) 102, as described above. The communicating module 228 can also receive data from the user device(s) 102 indicating whether a user 206 takes steps recommended by a recommending module (e.g., recommending module 232 and/or recommending module 246). The communicating module 228 can send recommendations from a recommending module (e.g., recommending module 232 and/or recommending module 246) to the user device(s) 102.

The communicating module 228 stored on the charging device(s) 104 can also send and receive data from the network(s) 106. In some examples, the communicating module 228 can send the logs, parameters, and/or data from the user device(s) 102 to the network(s) 106 for collection and/or analyzing. The communicating module 228 can receive data from the network(s) 106 such as demographic data and usage pattern data derived from a plurality of users 206 associated with a plurality of user device(s) 102 that are communicatively coupled to the network(s) 106. Additionally, the communicating module 228 can receive predictive models trained and sent by server(s) and/or other machines 204 associated with the network(s) 106 and updates to the predictive models in predetermined time intervals. In some examples, the communicating module 228 can receive recommendations from the network(s) 106 based at least in part on the logs, parameters, and/or data the communicating module 228 stored on the charging device(s) 104 received from the user device(s) 102 and sent to the network(s) 106.

The analyzing module 230 stored on the charging device(s) 104 can process the logs, parameters, and/or data from the user device(s) 102. In some examples, the analyzing module 230 can scan through the logs, parameters, and/or data received from the user device(s) 102 to identify bad mapping that may have affected and/or may be affecting the performance of the user device(s) 102. The analyzing module 230 can identify bad mapping by comparing standard logs, parameters, and/or data associated with the user device(s) 102 with the logs, parameters, and/or data received from the user device(s) 102. The standard logs, parameters, and/or data can be derived from factory settings and/or data collected from the network(s) 106. In at least one example, the standard logs, parameters, and/or data can be regularly updated based on updates received from the network(s) 106 and/or machine learning associated with logs, parameters, and/or data collected from a plurality of users associated with the network(s) 106. By comparing the logs, parameters, and/or data from the user device(s) to the standard logs, parameters, and/or data stored in the analyzing module 230, the analyzing module 230 can identify issues that may be affecting performance of the user device(s) 102. The analyzing module 230 can provide diagnostic data identifying the issues that may be affecting performance of the user device(s) 102 to the recommending module 232 stored on the charging device(s) 104.

The analyzing module 230 can also proactively identify issues that may affect performance of the user device(s) 102 based on predictive models trained in the server(s) and/or other machines 204 associated with the network(s) 106, as described below. The analyzing module 230 can leverage the predictive models for processing the logs, parameters, and/or data from the user device(s) 102 to identify usage patterns associated with the user 206 of the user device(s) 102 that may affect performance of the user device(s) 102. The analyzing module 230 can provide diagnostic data identifying the issues that may be affecting performance of the user device(s) 102 to the recommending module 232.

In at least one example, the analyzing module 230 stored on the charging device(s) 104 can perform all of the analysis on the charging device(s) 104. In other examples, the analyzing module 230 stored on the charging device(s) 104 can perform some of the analysis on the charging device(s) 104 and can offload some of the analysis to the server(s) and/or other machines 204. The communicating module 228 stored on the charging device(s) 104 can receive diagnostic data based on analysis performed by server(s) and/or other machines 204 associated with the network(s) 106. In yet other examples, the analyzing module 230 stored on the charging device(s) 104 may not perform any analysis on the charging device(s) 104 and the charging device(s) 104 can send the logs, parameters, and/or data from the user device(s) 102 to the server(s) and/or other machines 204 associated with the network(s) 106.

The recommending module 232 stored on the charging device(s) 104 can send recommendations to the presenting module 218 for remedying issues affecting performance and/or potential issues that may affect performance. For instance, the recommending module 232 can receive the diagnostic data identifying the issues that may be affecting performance of the user device(s) 102. The recommending module 232 can leverage the diagnostic data to determine actions the user 206 can take with respect to the user device 102 to remedy and/or prevent performance degradation. In at least some examples, the recommending module 232 may generate options for remedying and/or preventing performance degradation in the user device(s) 102 and instructions for implementing the options that may be executed by the user device 102 receiving the instructions. The recommending module 232 can output the recommendations to the presenting module 218. In at least one example, the recommending module 232 can output the recommendations to the communicating module 228 and the communicating module 228 can send the recommendations to the presenting module 218.

In at least one example, as shown in FIG. 2, the presenting module 218 can be associated with the user device(s) 102 for causing a prompt to be displayed on the display 214 associated with the user device(s) 102. In other examples, however, the presenting module can be associated with the charging device(s) 104 for causing a presentation to be displayed on the display 226 associated with the charging device(s) 104.

The service provider 202 can be any entity, server(s), platform, etc., that can collect data from one or more users 206 associated with the one or more user device(s) 102, analyze data associated with the one or more user device(s) 102, and/or diagnose and remedy problems on the one or more user device(s) 102 while corresponding charging device(s) 104 charge the user device(s) 102. Moreover, and as shown, the service provider 102 can include one or more server(s) and/or other machines 204, which can include one or more processing unit(s) 234 and computer-readable media 236. The one or more server(s) and/or other machines 204 can include devices.

Examples support scenarios where device(s) that can be included in the one or more server(s) and/or other machines 204 can include one or more computing devices that operate in a cluster or other grouped configuration to share resources, balance load, increase performance, provide failover support or redundancy, or for other purposes. Device(s) included in the one or more server(s) and/or other machines 204 can belong to a variety of categories or classes of devices such as traditional server-type devices, desktop computer-type devices, mobile devices, special purpose-type devices, embedded-type devices, and/or wearable-type devices. Thus, although illustrated as server computers, device(s) can include a diverse variety of device types and are not limited to a particular type of device. Device(s) included in the one or more server(s) and/or other machines 204 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device.

Device(s) that can be included in the one or more server(s) and/or other machines 204 can include any type of computing device having one or more processing unit(s) 234 operably connected to computer-readable media 236 such as via a bus, which in some instances can include one or more of a system bus, a data bus, an address bus, a PCI bus, a Mini-PCI bus, and any variety of local, peripheral, and/or independent buses. Executable instructions stored on computer-readable media 236 can include, for example, collecting module 238, learning module 240, and other modules, programs, or applications that are loadable and executable by processing units(s) 234. In at least one example, the one or more server(s) and/or other machines 204 can additionally or alternatively include a communicating module 242, analyzing module 244, and/or recommending module 246 for performing at least some of the functions described above with respect to the communicating module 228, analyzing module 230, and recommending module 232 stored on the charging device(s) 104.

The collecting module 238 can collect data associated with a plurality of users 206 of a plurality of user device(s) 102 associated with the network(s) 106. The collecting module 238 can collect demographic data from the users 206 such as gender, age, profession, geographic locations, travel patterns, etc. The collecting module 238 can also collect activity logs and/or debugging logs from user devices that are communicatively coupled to the network(s) 106, such as user device(s) 102. The activity logs and/or demographic data can be used to determine usage patterns such as applications that a user can run on his or her device, combinations of applications that a user regularly runs simultaneously on his or her device, locations where the user typically uses his or her device, times of a day the user typically uses his or her device, etc. The debugging logs from user device(s) 102 that are communicatively coupled to the network(s) 106 can be used to correlate usage patterns with issues that cause degradation of performance on the user device(s) 102. The collecting module 238 can collect the data by directly communicating with the user device(s) 102 or indirectly communicating with the user device(s) through the charging device(s) 104.

In some examples, the collecting module 238 may request permission before collecting and/or storing data associated with a plurality of users 206 of the plurality of user device(s) 102 associated with the network(s) 106. For instance, the collecting module 238 may request to access information that includes personally identifiable information (PII) that identifies or can be used to identify, contact, or locate a person to whom such information pertains. In such examples, a user 206 may be provided with notice that the systems and methods herein are collecting PII. Additionally, prior to initiating PII data collection, users 206 may have an opportunity to opt-in or opt-out of the PII data collection. For example, a user 206 may opt-in to the PII data collection by taking affirmative action indicating that he or she consents to the PII data collection. Alternatively, a user 206 may be presented with an option to opt-out of the PII data collection. An opt-out option may require an affirmative action to opt-out of the PII data collection, and in the absence of affirmative user action to opt-out, PII data collection may be impliedly permitted. The collecting module 238 may also leverage various security mechanisms to encrypt or otherwise protect data associated with the plurality of users 206 of the plurality of user device(s) 102 that may be stored in the collecting module 238.

The learning module 240 can leverage machine learning to develop predictive models based on the demographic data, usage patterns, and/or issues that cause degradation of performance on the user device(s) 102. The learning module 240 can provide the predictive models to the analyzing module 244 stored in the server(s) and/or other machines 204 for identifying issues that can reduce the efficiency of user device performance based on logs, parameters, and/or other data received from the user device(s) 102. In some examples, the learning module 240 can send the predictive models to the charging device(s) 104 so that the analyzing module 230 stored on the charging device(s) 104 can process the logs, parameters, and/or other data received from the user device(s) 102 on the charging device(s) 104 using the predictive models.

The collecting module 238 can collect new data from the users 206 of the plurality of user device(s) 102 over time and the learning module 240 can leverage the new data to update the predictive models. In examples where the learning module 240 sends the predictive models to the charging device(s) 104, the learning module 240 can send the updates to the charging device(s) 104 for updating the predictive models stored on the charging device(s) 104. The learning module 240 can send the updates to the charging device(s) 104 in predetermined time intervals (e.g., hourly, daily, monthly, etc.).

The communicating module 242 stored on the server(s) and/or other machines 204 can send and receive data from the user device(s) 102 and/or the charging device(s) 104. For instance, the communicating module 242 can receive the logs, parameters, and/or data from the user device(s) 102. The data can include network data and/or user demographic data from the user device(s) 102, as described above. The communicating module 242 can also receive data from the user device(s) 102 indicating whether a user 206 takes steps recommended by a recommending module (e.g., recommending module 232 and/or recommending module 246). Additionally and/or alternatively, the communicating module 242 can send recommendations from a recommending module (e.g., recommending module 232 and/or recommending module 246) to the user device(s) 102.

The communicating module 242 stored on server(s) and/or other machines 204 can also exchange data with the charging device(s) 104. In some examples, the communicating module 242 can receive the logs, parameters, and/or data from the user device(s) 102 from the charging device(s)

104 for collecting and/or analyzing. The communicating module 242 can send data collected by the collecting module 238 such as demographic data and usage pattern data derived from a plurality of users 206 associated with a plurality of user device(s) 102 that are communicatively coupled to the network(s) 106. Additionally, the communicating module 242 can send predictive models trained in the learning module 240 and updates to the predictive models in predetermined time intervals. In some examples, the communicating module 242 can send recommendations to the charging device(s) 104 based at least in part on the logs, parameters, and/or data the communicating module 242 received from the user device(s) 102.

The analyzing module 244 stored on the server(s) and/or other machines 204 can process the logs, parameters, and/or data from the user device(s) 102. In some examples, the analyzing module 244 can scan through the logs, parameters, and/or data received from the user device(s) 102 to identify bad mapping that may have affected and/or may be affecting the performance of the user device(s) 102. The analyzing module 244 can identify bad mapping by comparing standard logs, parameters, and/or data associated with the user device(s) 102 with the logs, parameters, and/or data received from the user device(s) 102. The standard logs, parameters, and/or data can be derived from factory settings and/or data collected from the network(s) 106. In at least one example, the standard logs, parameters, and/or data can be regularly updated based on updates received from the network(s) 106 and/or machine learning associated with logs, parameters, and/or data collected from a plurality of users associated with the network(s) 106. By comparing the logs, parameters, and/or data from the user device(s) to the standard logs, parameters, and/or data stored in the analyzing module 244, the analyzing module 244 can identify issues that may be affecting performance of the user device(s) 102. The analyzing module 244 can provide diagnostic data identifying the issues that may be affecting performance of the user device(s) 102 to the recommending module 232 stored on the charging device(s) 104 and/or the recommending module 246 stored on the server(s) and/or other machines 204.

The analyzing module 244 can also proactively identify issues that may affect performance of the user device(s) 102 based on predictive models trained in the learning module 240. The analyzing module 244 can leverage the predictive models for processing the logs, parameters, and/or data from the user device(s) 102 to identify usage patterns associated with the user 206 of the user device(s) 102 that may affect performance of the user device(s) 102. The analyzing module 244 can provide diagnostic data identifying the issues that may be affecting performance of the user device(s) 102 to the recommending module 232 stored in the charging device(s) 104 and/or the recommending module 246 stored in the server(s) and/or other machines 204.

As described above, the analyzing module 230 stored on the charging device(s) 104 can perform all of the analysis on the charging device(s) 104. In other examples, the analyzing module 230 stored on the charging device(s) 104 can perform some of the analysis on the charging device(s) 104 and can offload some of the analysis to the analyzing module 244 stored on the server(s) and/or other machines 204. The communicating module 242 can send diagnostic data to the charging device(s) 104 based on analysis performed by analyzing module 230 stored on the server(s) and/or other machines 204 associated with the network(s) 106. In yet other examples, the analyzing module 230 stored on the charging device(s) 104 may not perform any analysis on the charging device(s) 104 and the analyzing module 244 stored on the server(s) and/or other machines 204 can process the logs, parameters, and/or data from the user device(s) 102.

The recommending module 246 stored on the server(s) and/or other machines 204 can send recommendations for remedying issues affecting performance and/or potential issues that may affect performance to the communicating module 228 stored on the charging device(s) 104. For instance, the recommending module 246 can receive the diagnostic data identifying the issues that may be affecting performance of the user device(s) 102. The recommending module 246 can leverage the diagnostic data to determine actions a user 206 can take with respect to a user device 102 to remedy and/or prevent performance degradation. In at least some examples, the recommending module 246 may generate options for remedying and/or preventing performance degradation in the user device(s) 102 and instructions for implementing the options that may be executed by the user device 102 receiving the instructions. The recommending module 246 can output the recommendations to the charging device(s) 104 for outputting to the presenting module 218. In at least one example, the recommending module 246 can output the recommendations to the communicating module 242 and the communicating module 242 can send the recommendations to the presenting module 218. In at least one example, as shown in FIG. 2, the presenting module 218 can be associated with the user device(s) 102 for causing a prompt to be displayed on the display 214 associated with the user device(s) 102. In other examples, however, the presenting module can be associated with the charging device(s) 104 for causing a presentation to be displayed on the display 226 associated with the charging device(s) 104.

Alternatively, or in addition, the functionality described herein can be performed, at least in part, by one or more hardware logic components or accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU course embedded in an FPGA fabric.

Device(s) that can be included in the one or more server(s) and/or other machines 204 can further include one or more input/output (I/O) interface(s) coupled to the bus to allow device(s) to communicate with other devices such as user input peripheral devices (e.g., a keyboard, a mouse, a pen, a game controller, a voice input device, a touch input device, gestural input device, an image camera, a depth sensor, and the like) and/or output peripheral devices (e.g., a display, a printer, audio speakers, a haptic output, and the like). Devices that can be included in the one or more server(s) and/or other machines 204 can also include one or more network interfaces coupled to the bus to enable communications between computing devices and other networked devices such as user device(s) 102. Such network interface(s) can include one or more network interface controllers (NICs) or other types of transceiver devices to send and receive communications over a network. For simplicity, some components are omitted from the illustrated devices.

Processing unit(s) 208, 222, and/or 234 can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various embodiments, the processing unit(s) 208, 222, and/or 234 can execute one or more modules and/or processes to cause the user device(s) 102, charging device(s) 104, and/or server(s) and/or other machines 204, respectively, to perform a variety of functions, as set forth above and explained in further detail in the following disclosure. Additionally, each of the processing unit(s) 208, 222, and/or 234 can possess its own local memory, which also can store program modules, program data, and/or one or more operating systems.

In at least one configuration, the computer-readable media 210, 224, and/or 236 of the user device(s) 102, charging device(s) 104, and server(s) and/or other machines 204, respectively, can include components that facilitate interaction between the service provider 202 and the users 206. For example, the computer-readable media 210, 224, and/or 236 can include modules that can be implemented as computer-readable instructions, various data structures, and so forth via at least one processing unit(s) 208, 222, and/or 234, respectively, to configure a device to execute instructions and to perform operations for diagnosing and remedying problems on user devices via a self-healing charging device. Functionality to perform these operations can be included in multiple devices or a single device.

Depending on the exact configuration and type of the user device(s) 102, charging device(s) 104, and/or one or more server(s) and/or other machines 204, the computer-readable media 210, 224, and/or 236, respectively, can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media includes computer readable instructions, data structures, program modules, or other data in a modulated data signal, such as a carrier wave, or other transmission mechanism. As defined herein, computer storage media does not include communication media.

Example Processes

Figure 3:
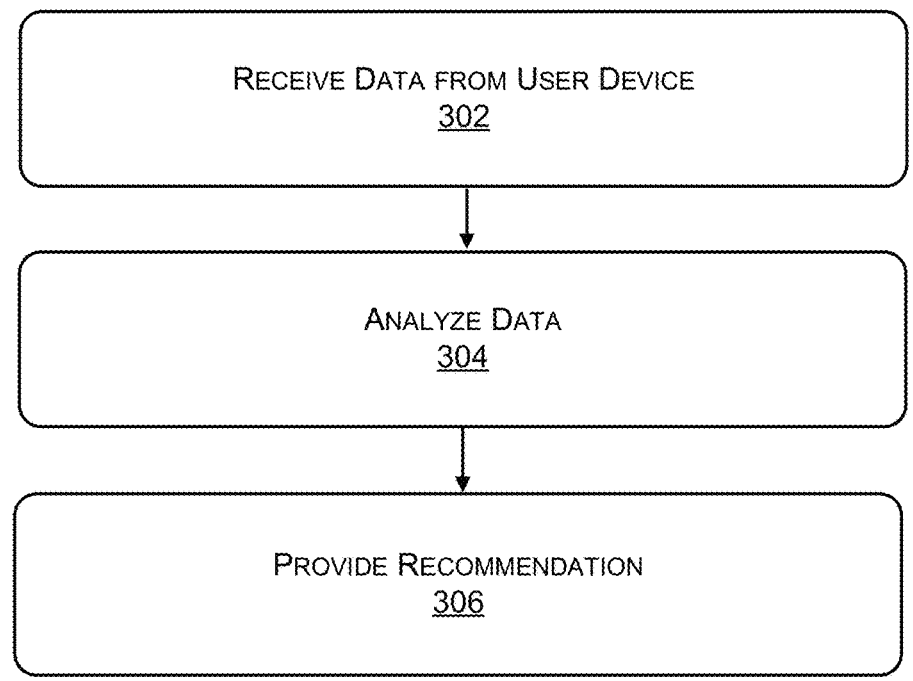
FIG. 3 is a flow diagram that shows an example process for diagnosing and remedying problems on user devices via self-healing charging devices.

FIG. 3 is a flow diagram that shows an example process 300 for diagnosing and remedying problems on user device(s) 102 via self-healing charging device(s) 104.

Block 302 illustrates receiving data from a user device 102 connected to a charging device 104. A user 206 can communicatively connect a user device 102 to a charging device 104. In some examples, if the charging device 104 is a wired charging device, the user 206 can physically connect the user device 102 and the charging device 104. In other examples, if the charging device 104 is a wireless charging device, the user can associate the user device 102 and charging device 104 such to charge the user device 102 by inductive coupling, conductive recharging mats, radio transmission, WiFi, etc.

Based at least in part on the user device 102 detecting a connection to the charging device 104, an application 212 can query logs, parameters, and/or data on the user device 102. As described above, in some examples, the application(s) 212 can query various components associated with the user device 102 to retrieve parameters stored for each of the various components. In other examples, the application(s) 212 can query the storage module 216 for logs representative of activities performed by the respective user device 102. The user device 102 can send the logs, parameters, and/or data to the charging device 104. The communicating module 228 can receive the logs, parameters, and/or data at the charging device 104.

Block 304 illustrates analyzing the data. The analyzing module 230 stored on the charging device 104 can process the logs, parameters, and/or data from the user device 102. In some examples, the analyzing module 230 can scan through the logs, parameters, and/or data received from the user device 102 to identify bad mapping that can have affected and/or can be affecting the performance of the user device 102. The analyzing module 230 can identify bad mapping by comparing standard logs, parameters, and/or data associated with the user device(s) 102 with the logs, parameters, and/or data from the user device 102. The standard logs, parameters, and/or data can be derived from factory settings and/or data collected from the network(s) 106, as described above. By comparing the logs, parameters, and/or data from the user device to the standard logs, parameters, and/or data stored in the analyzing module 230, the analyzing module 230 can identify issues that can be affecting performance of the user device 102. The analyzing module 230 can provide diagnostic data identifying the issues that may be affecting performance of the user device 102 to the recommending module 232 stored on the charging device 104.

The analyzing module 230 stored in the charging device 104 can also identify issues that may affect performance of the user device 102 based on predictive models trained in the server(s) and/or other machines 204 associated with the network(s) 106, as described below. The analyzing module 230 can leverage the predictive models for processing the logs, parameters, and/or data from the user device 102 to identify usage patterns associated with the user 206 of the user device 102 that may affect performance of the user device 102.

Block 306 illustrates providing a recommendation. The recommending module 232 stored on the charging device 104 can receive diagnostic data based on analyzing the logs, parameters, and/or data from the user device 102. The diagnostic data can identify issues that may be affecting performance of the user device 102 and the recommendation module 232 can leverage the diagnostic data to determine actions the user can take with respect to the user device 102 to remedy and/or prevent performance degradation. In at least some examples, the recommending module 232 may generate options for remedying and/or preventing performance degradation in the user device 102 and instructions for implementing the options that may be executed by the user device 102 receiving the instructions. The recommending module 232 can output the recommendations to the presenting module 218. As described above, while the presenting module 218 is illustrated in FIG. 2 as being associated with the user device 102, in some examples, a presenting module can additionally or alternatively be stored on the charging device 104.

Figure 4:
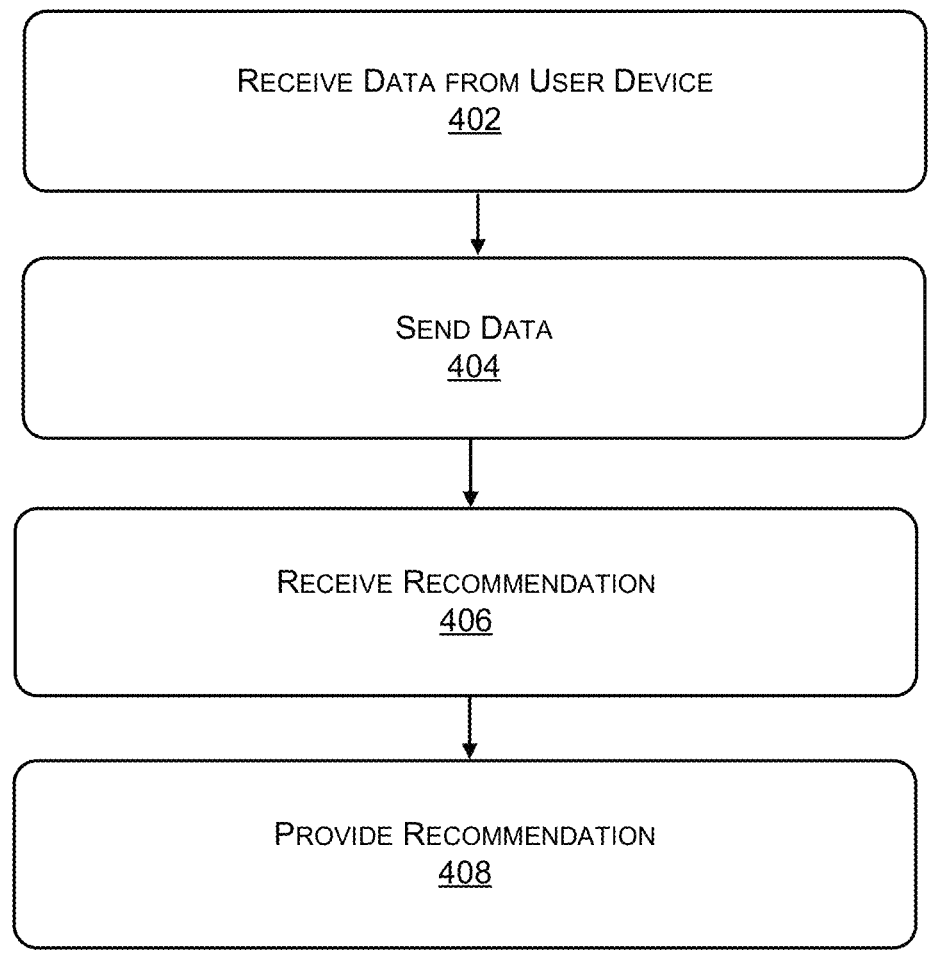
FIG. 4 is a flow diagram that shows another example process for diagnosing and remedying problems on user devices via self-healing charging devices.

FIG. 4 is a flow diagram that shows another example process 400 for diagnosing and remedying problems on user device(s) 102 via self-healing charging device(s) 104.

Block 402 illustrates receiving data from a user device 102 connected to a charging device 104. Based at least in part on the user device 102 detecting a connection to the charging device 104, an application 212 can query logs, parameters, and/or data on the user device 102. The user device 102 can send the logs, parameters, and/or data to the charging device 104.

Block 404 illustrates sending data. The communicating module 228 stored on the charging device 104 can send the logs, parameters, and/or data from the user device 102 to the server(s) and/or other machines 204 associated with the network(s) 106. The logs, parameters, and/or data from the user device 102 can be received by a communicating module 242 stored on the server(s) and/or other machines 204 associated with the network(s) 106 and the communicating module 242 can provide the logs, parameters, and/or data from the user device 102 to an analyzing module 244 stored on the server(s) and/or other machines 204. The analyzing module 244 can process the logs, parameters, and/or data from the user device 102. For instance, the analyzing module 244 can process the data by scanning user device data received from the user device 102 to identify causes of performance degradation in the user device 102 and/or comparing the user data received from the user device 102 with the network data received from the network 106 to predict causes of performance degradation. In some examples, the logs, parameters, and/or data from the user device 102 can also be stored in the collecting module 238 for training and/or updating predictive models.

Block 406 illustrates receiving a recommendation. The recommending module 246 stored on the server(s) and/or other machines 204 associated with the network(s) 106 can receive diagnostic data identifying the issues that may be affecting performance of the user device 102 from the analyzing module 244. Based at least in part on receiving the diagnostic data from the analyzing module 244, the recommendation module 246 can formulate recommendations for remedying and/or preventing performance degradation. In at least some examples, the recommending module 246 may generate options for remedying and/or preventing performance degradation in the user device 102 and instructions for implementing the options that may be executed by the user device 102 receiving the instructions. The recommending module 246 can output a recommendation to the communicating module 242 for sending the recommendation to the charging device 104. The communicating module 228 on the charging device 104 can receive the recommendation and provide the recommendation to the recommending module 232 on the charging device 104.

Block 408 illustrates providing the recommendation. The recommending module 232 stored on the charging device 104 can output the recommendations to the presenting module 218, as described above.

Figure 5:
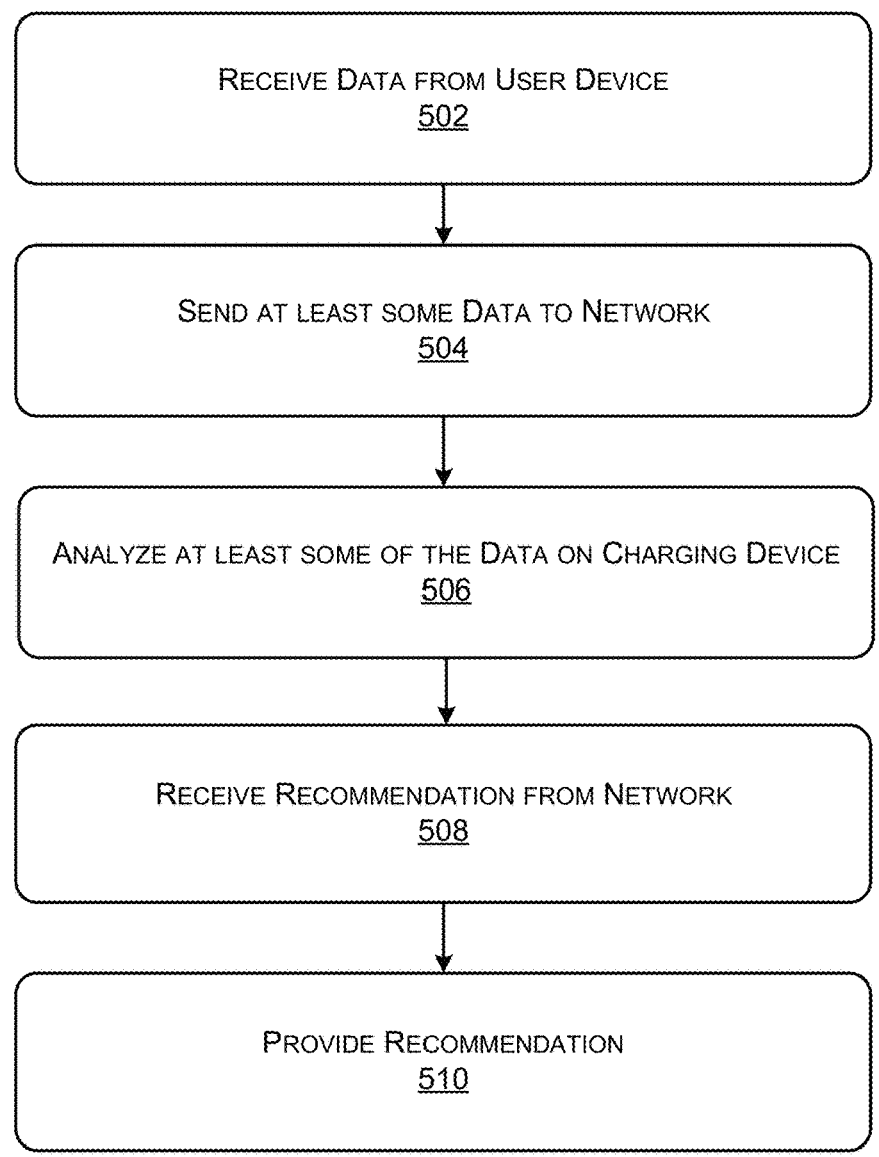
FIG. 5 is a flow diagram that shows another example process for diagnosing and remedying problems on user devices via self-healing charging devices.

FIG. 5 is a flow diagram that shows another example process 500 for diagnosing and remedying problems on user device(s) 102 via self-healing charging device(s) 104.

Block 502 illustrates receiving data from a user device 102 connected to a charging device 104. As described above, based at least in part on the user device 102 detecting a connection to the charging device 104, an application 212 can query logs, parameters, and/or data on the user device 102. The user device 102 can send the logs, parameters, and/or data to the charging device 104.

Block 504 illustrates sending at least some data to a network 106. The communicating module 228 stored on the charging device 104 can send at least some of the logs, parameters, and/or data from the user device 102 to the server(s) and/or other machines 204 associated with the network(s) 106. The logs, parameters, and/or data from the user device 102 can be received by a communicating module 242 stored on the server(s) and/or other machines 204 associated with the network(s) 106 and the communicating module 242 can provide the logs, parameters, and/or data from the user device 102 to an analyzing module 244 stored on the server(s) and/or other machines 204. The analyzing module 244 can process the logs, parameters, and/or data from the user device 102, as described above. In some examples, the logs, parameters, and/or data from the user device 102 can also be stored in the collecting module 238 for training and/or updating predictive models.

Block 506 illustrates analyzing at least some of the data on the charging device 104. As described above, the communicating module 228 stored on the charging device 104 can send at least some of the logs, parameters, and/or data from the user device 102 to the server(s) and/or other machines 204 associated with the network(s) 106. However, the charging device 104 may not send all of the logs, parameters, and/or data from the user device 102. Instead, the charging device 104 can keep some of the logs, parameters, and/or data from the user device 102 on the charging device 104 for processing by the analyzing module 230 stored on the charging device 104.

Block 508 illustrates receiving a recommendation from the network(s) 106. The recommending module 246 stored on the server(s) and/or other machines 204 can receive diagnostic data from the analyzing module 244 stored on the server(s) and/or other machines 204. The diagnostic data may identify issues that may be affecting performance of the user device 102 from the analyzing module 244 stored on the server(s) and/or other machines 204. The recommending module 246 may leverage the diagnostic data to determine actions the user can take with respect to the user device 102 to remedy and/or prevent performance degradation. In at least some examples, the recommending module 246 may generate options for remedying and/or preventing performance degradation in the user device 102 and instructions for implementing the options that may be executed by the user device 102 receiving the instructions. The recommending module 246 can output a recommendation to the communicating module 242 for sending the recommendation to the charging device 104. The communicating module 228 on the charging device 104 can receive the recommendation and provide the recommendation to the recommending module 232 on the charging device 104.

Block 510 illustrates providing a recommendation to the charging device 104 or the user device 102. The recommending module 232 stored on the charging device 104 can output the recommendations to the presenting module 218, as described above. The communicating module 228 stored on the charging device 104 can send recommendations to the presenting module 218 based at least in part on recommendations provided by the recommending module 246 stored in the server(s) and/or other machines 204 and/or the recommending module 232 stored on the charging device 104.

Figure 6:
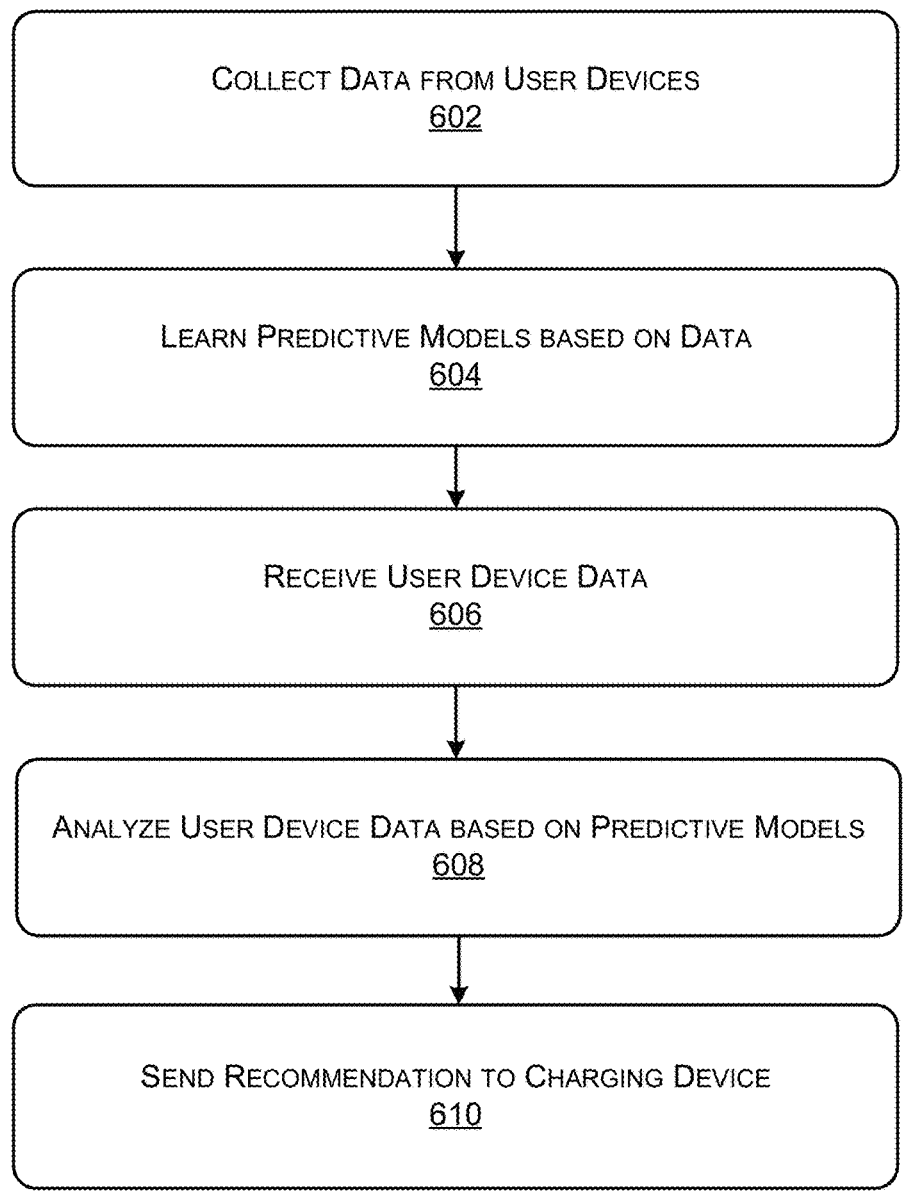
FIG. 6 is a flow diagram that shows another example process for diagnosing and remedying problems on user devices via self-healing charging devices.

FIG. 6 is a flow diagram that shows another example process 600 for diagnosing and remedying problems on user device(s) 102 via self-healing charging device(s).

Block 602 illustrates collecting data from user device(s) 102 communicatively coupled to the network(s) 106. The collecting module 238 can collect data associated with a plurality of users 206 of a plurality of user device(s) 102 associated with the network(s) 106. The collecting module 238 can collect demographic data such as gender, age, profession, geographic locations, travel patterns, etc. The collecting module 238 can also collect activity logs and/or debugging logs from user device(s) 102 that are communicatively coupled to the network(s) 106. The activity logs and/or demographic data can be used to determine usage patterns, as described above. The debugging logs from user device(s) 102 that are communicatively coupled to the network(s) 106 can be used to correlate usage patterns with issues that cause degradation of performance on the user device(s) 102. The collecting module 238 can collect data from the plurality of user device(s) 102 and/or from charging device(s) 104 charging individual user device(s) 102 of the plurality of user device(s) 102. In at least some examples, the logs, parameters, and data received by charging device(s) 104 from user device(s) 102 can be sent to the collecting module 238 via the charging device(s) 104. In other examples, the user device(s) 102 can communicate directly with the network(s) 106.

Block 604 illustrates learning predictive models based on data, including the data from the user device(s) 102. The learning module 240 can leverage machine learning to develop predictive models based on the demographic data, usage patterns, and/or issues that cause degradation of performance on the user devices. The learning module 240 can provide the predictive models to the analyzing module 244 stored on the server(s) and/or other machines 204 for identifying issues that can reduce the efficiency of user device performance based on logs, parameters, and/or other data received from the user device(s) 102. The collecting module 238 can collect new data over time and the learning module 240 can leverage the new data to update the predictive models.

Block 606 illustrates receiving user device data. As described above, based at least in part on a user device 102 detecting a connection to a charging device 104, an application 212 can query logs, parameters, and/or data on the user device 102. The user device 102 can send the logs, parameters, and/or data to the charging device 104 and the communicating module 228 stored on the charging device 104 can send the logs, parameters, and/or data to the server(s) and/or other machines 204.

Block 608 illustrates analyzing user device data based on predictive models. The analyzing module 244 stored on the server(s) and/or other machines 204 can identify issues that may affect performance of the user device 102 based at least in part on predictive models trained in the learning module 240. The analyzing module 244 can leverage the predictive models for processing the logs, parameters, and/or data from the user device 102 to identify usage patterns associated with the users 206 of the user device 102 that may affect performance of the user device 102.

Block 610 illustrates sending recommendations to the charging device 104. The recommending module 246 stored on the server(s) and/or other machines 204 can receive diagnostic data from the analyzing module 244. The diagnostic data can identify issues that may be affecting performance of the user device 102 from the analyzing module 244 stored on the server(s) and/or other machines 204. The recommendation module 246 may leverage the diagnostic data to determine actions the user 206 can take with respect to the user device 102 to remedy and/or prevent performance degradation. The recommending module 246 stored on the server(s) and/or other machines 204 can send recommendations to the communicating module 242 for sending the recommendation to the charging device 104. The communicating module 228 stored on the charging device 228 can receive the recommendation and provide the recommendation to the recommending module 232 stored on the charging device 104.

Figure 7:
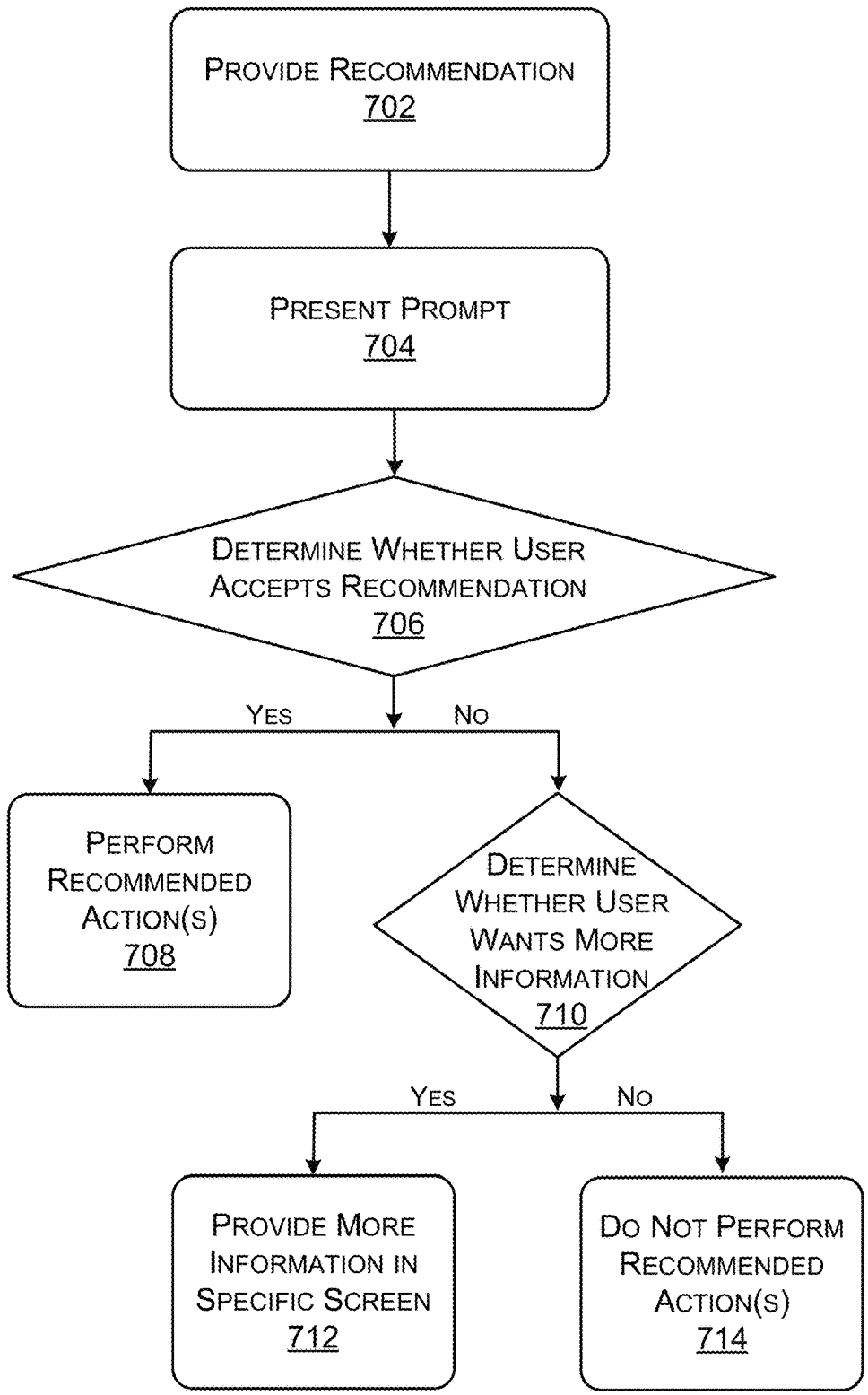
FIG. 7 is a flow diagram that shows an example process for presenting prompts based on recommendations for diagnosing and remedying problems on user devices via self-healing charging devices.

FIG. 7 is a flow diagram that shows an example process 700 for presenting prompts based on recommendations for diagnosing and remedying problems on user device(s) 102 via self-healing charging device(s) 104.

Block 702 illustrates providing a recommendation. The recommending module 232 stored on a charging device 104 and/or the recommending module 246 stored on the server(s) and/or other machines 204 can output the recommendations to the presenting module 218, as described above. In at least one example, the recommending module 232 and/or the recommendation module 246 can output the recommendations to communicating module 228 and/or communicating module 242 for sending the recommendations to the presenting module 218. In at least some examples, the recommending module 232 and/or recommending module 246 may generate options for remedying and/or preventing performance degradation in a user device 102 and instructions for implementing the options that may be executed by the user device 102 receiving the instructions.

Block 704 illustrates presenting a prompt based on the recommendation. The presenting module 218 can communicate with the application(s) 212 to cause recommendations to be presented to a user as prompts for receiving user input. The presenting module 218 can present a prompt to the user 106 via the display 214. In some examples, the prompt can include a general screen that presents users 206 with one or more options for remedying and/or preventing performance degradation in the user device 102. For instance, the prompt can provide the user 206 with an option to perform all actions recommended to remedy and/or prevent performance degradation in the user device 102, an option to deny all actions recommended for remedying and/or preventing performance degradation in the user device 102, or an option to deny all actions recommended for remedying and/or preventing performance degradation in the user device 102 and to view a specific screen. Additionally or alternatively, the prompt can provide the user 206 with an option to perform all actions recommended and to always perform all actions without future prompting, an option to deny all actions recommended and to always deny all actions without future prompting, or an option to always provide a specific screen. The specific screen can present users 206 with additional information, such as an itemized list of actions that the recommending module 232 and/or recommending module 246 recommends to be taken to remedy and/or prevent performance degradation in the user device 102. Users 206 can then selectively identify which actions of the recommended actions they would like to take to remedy and/or prevent performance degradation in his or her user device 102.

Decision block 706 illustrates determining whether a user 206 accepts the recommendation. The user 206 can interact with the display (e.g., 214 or 224) by selecting an option via a touch user interface, dictating an option via a spoken-language interface, etc. The user 206 can indicate that he or she accepts the recommendation, allowing the healing module 220 to take all actions recommended by the recommendation, or the user 206 can reject the recommendation.

Block 708 illustrates performing the recommended action(s) based at least in part on receiving user input indicating that the user 206 accepts the recommendation. Based at least in part on receiving an indication from a user 206 to perform the actions recommended by the recommending module 232 and/or recommending module 246, the healing module 220 can effectuate those actions by executing the instructions received from recommending module 232 and/or recommending module 246. For instance, the healing module 220 can partially restart the user device(s) 102, reset or recharge the battery, close down one or more application(s) 212 running in the background, etc.

Decision block 710 illustrates determining whether the user wants more information, based at least in part on receiving user input indicating that the user does not accept the recommendation. As described above, the user can select the option to deny all actions recommended for remedying and/or preventing performance degradation in the user device 102 or the option to deny all actions recommended for remedying and/or preventing performance degradation in the user device 102 and to view a specific screen. The specific screen can present users 206 with additional information, such as an itemized list of actions that the recommending module 232 and/or recommending module 246 recommends to be taken to remedy and/or prevent performance degradation in the user device 102.

Block 712 illustrates providing more information in a specific screen based at least in part on receiving user input indicating the user wants more information. As discussed above, users 206 can selectively identify which actions of the recommended actions in the list of actions they would like to allow the healing module 220 to effectuate to remedy and/or prevent performance degradation in his or her user device 102.

Block 714 illustrates not performing recommended action(s) based at least in part on receiving user input indicating that the user 206 does not want more information. As described above, the user 206 can reject the recommendation and may not indicate that he or she wants any additional information. Accordingly, the healing module 220 can refrain from performing any actions to improve the performance of the user device 102.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-readable medium storing computer-executable instructions that, when executed, cause one or more processors of one or more computing devices to perform acts comprising:
    receiving, over a network, performance data associated with one or more user devices;
    receiving, over the network, user device performance data associated with a particular user device;
    analyzing the user device performance data based at least in part on a comparison of the user device performance data against the performance data;
    determining a recommendation for remedying or preventing a degradation in a performance of the particular user device based on the analyzing; and
    sending, over the network, the recommendation to a charging device that is charging the particular user device.

2. The computer-readable medium of claim 1, wherein the analyzing comprises:
    generating a predictive model based at least in part on the performance data; and
    applying the predictive model to the user device performance data.

3. The computer-readable medium of claim 2, wherein:
    the performance data from the one or more user devices comprises demographic data and usage pattern data; and
    the predictive model identifies issues that reduce an efficiency of the performance of the particular user device based on the demographic data, the usage pattern data, and the user device performance data.

4. The computer-readable medium of claim 2, the acts further comprising sending the predictive model over the network to a second charging device, wherein the second charging device is configured to use the predictive model to generate a second recommendation for remedying or preventing a second degradation in a second performance of a different user device while charging the different user device.

5. The computer-readable medium of claim 2, the acts further comprising:
    receiving, over the network, new performance data from the one or more user devices; and
    updating the predictive model based on the new performance data.

6. The computer-readable medium of claim 1, wherein the user device performance data is received from the charging device while the charging device is charging the particular user device.

7. The computer-readable medium of claim 1, wherein the performance data is received over the network directly from the one or more user devices.

8. The computer-readable medium of claim 1, wherein the performance data is received over the network indirectly from one or more other charging devices that receive the performance data while charging the one or more user devices.

9. The computer-readable medium of claim 1, wherein the user device performance data comprises logs describing activities and errors associated with the particular user device.

10. A method comprising:
    receiving, by one or more computing devices over a network, performance data associated with one or more user devices;

receiving, by the one or more computing devices over the network, user device performance data associated with a particular user device;

analyzing, by the one or more computing devices, the user device performance data based at least in part on a comparison of the user device performance data against the performance data;

determining, by the one or more computing devices, a recommendation for remedying or preventing a degradation in a performance of the particular user device based on the analyzing; and sending, by the one or more computing devices over the network, the recommendation to a charging device that is charging the particular user device.

11. The method of claim 10, wherein the analyzing comprises:

generating, by the one or more computing devices, a predictive model based at least in part on the performance data; and applying, by the one or more computing devices, the predictive model to the user device performance data.

12. The method of claim 11, further comprising sending, by the one or more computing devices, the predictive model over the network to a second charging device, wherein the second charging device is configured to use the predictive model to generate a second recommendation for remedying or preventing a second degradation in a second performance of a different user device while charging the different user device.

13. The method of claim 10, wherein the user device performance data is received from the charging device while the charging device is charging the particular user device.

14. The method of claim 10, wherein the performance data is received over the network directly from the one or more user devices.

15. The method of claim 10, wherein the performance data is received over the network indirectly from one or more other charging devices that receive the performance data while charging the one or more user devices.

16. One or more computing devices, comprising:

one or more processors;

a communication component configured to communicate over a network with at least one of one or more charging devices and one or more user devices; and memory storing computer-executable instructions that, when executed by the one or more processors, cause the one or more computing devices to perform operations comprising:

receiving, over the network, performance data associated with the one or more user devices;

receiving, over the network, user device performance data associated with a particular user device;

analyzing the user device performance data based at least in part on a comparison of the user device performance data against the performance data;

determining a recommendation for remedying or preventing a degradation in performance of the particular user device based on the analyzing; and sending, over the network, the recommendation to one of the one or more charging devices that is charging the particular user device.

17. The one or more computing devices of claim 16, wherein the analyzing comprises:

generating a predictive model based at least in part on the performance data; and applying the predictive model to the user device performance data.

18. The one or more computing devices of claim 17, wherein the operations further comprise sending the predictive model over the network to a second one of the one or more charging devices, wherein the second one of the one or more charging devices is configured to use the predictive model to generate a second recommendation for remedying or preventing a second degradation in performance of a different user device while charging the different user device.

19. The one or more computing devices of claim 16, wherein the user device performance data is received from one of the one or more charging devices while the one of the one or more charging devices is charging the particular user device.

20. The one or more computing devices of claim 16, wherein the performance data is received over the network indirectly from one or more other ones of the one or more charging devices that receive the performance data while charging the one or more user devices.

* * * * *